June 9, 1953  A. G. SCHNEIDER  2,641,144
HYDRAULIC-MECHANICAL TRANSMISSION
Filed Sept. 12, 1947  3 Sheets-Sheet 2
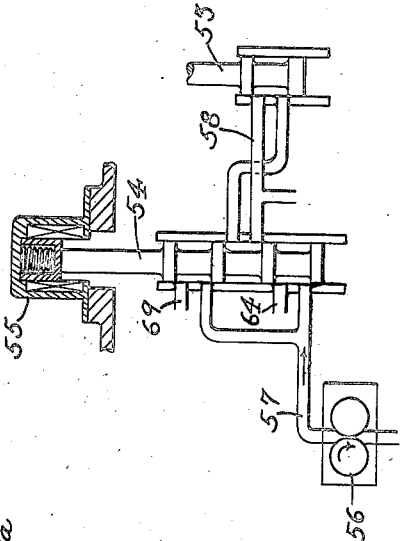
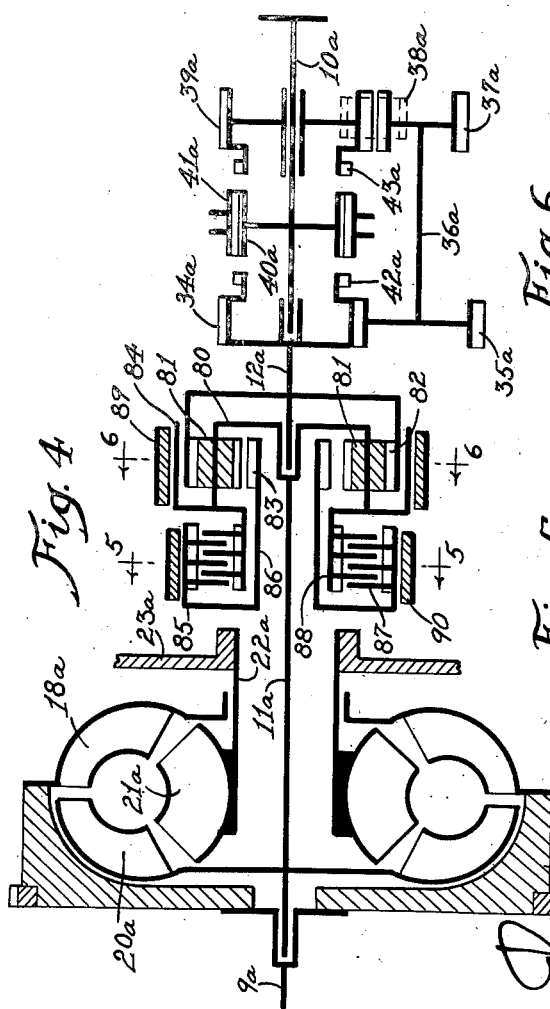
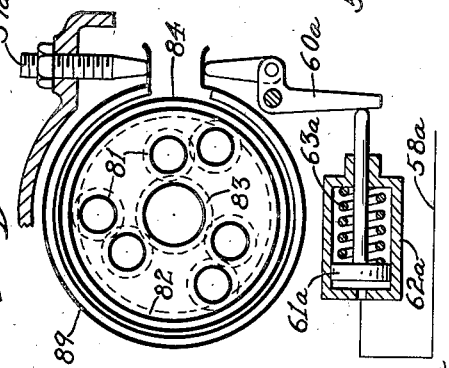
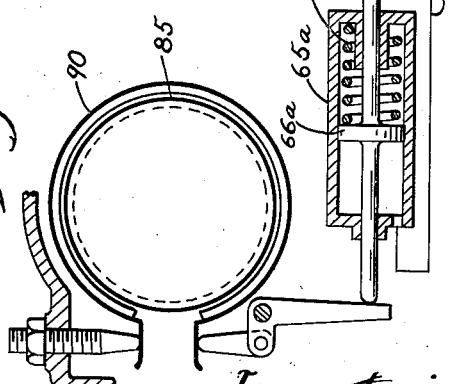
Inventor:
Adolf G. Schneider

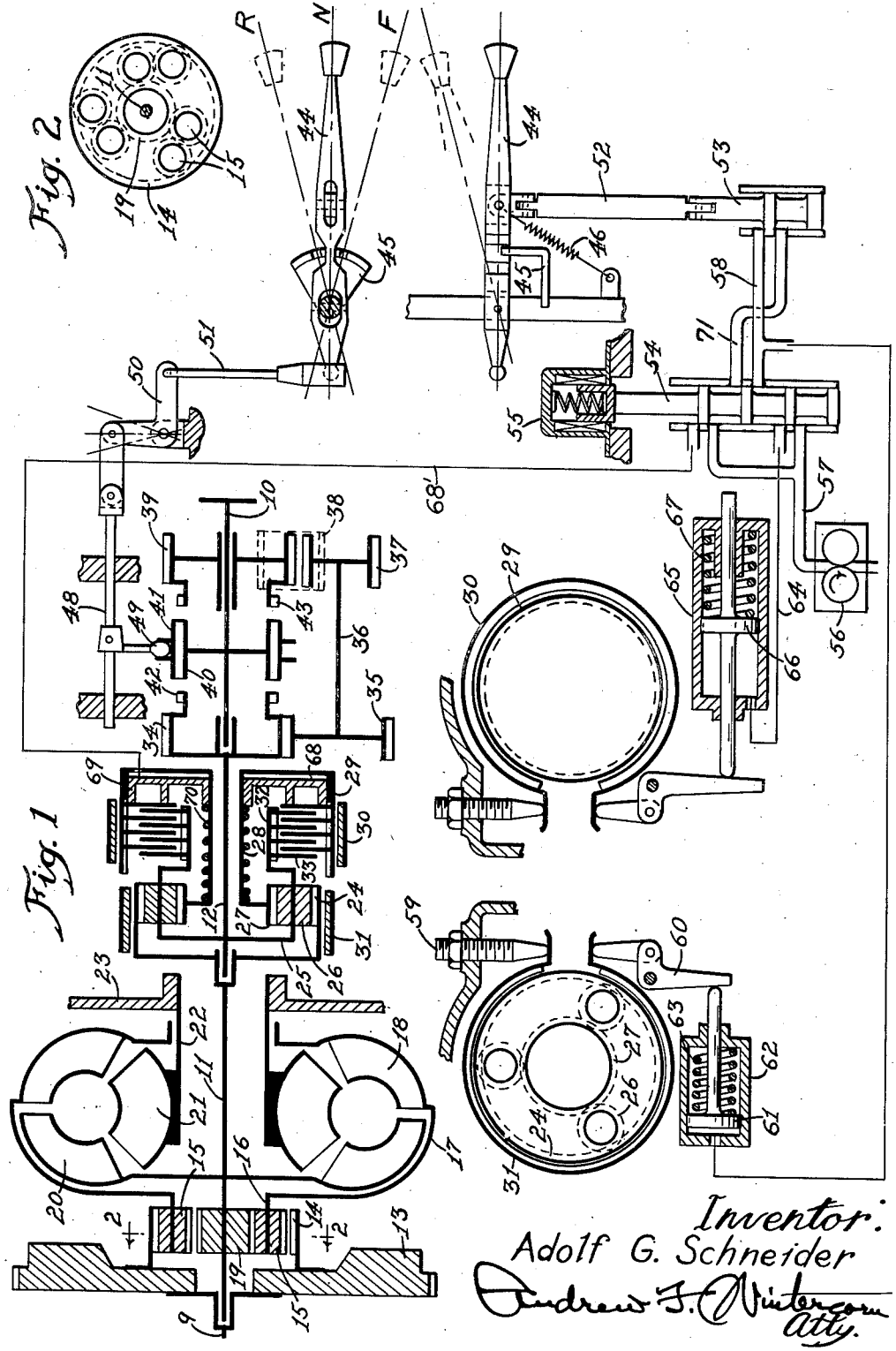

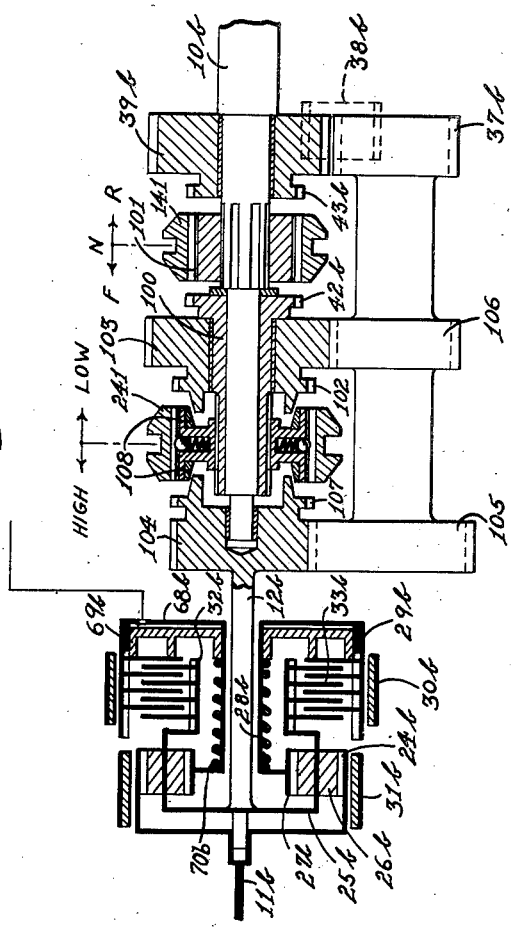

Patented June 9, 1953

2,641,144

UNITED STATES PATENT OFFICE 2,641,144

HYDRAULIC-MECHANICAL TRANSMISSION

Adolf G. Schneider, Muncie, Ind., assignor to Schneider Brothers Company, Muncie, Ind., a copartnership Application September 12, 1947, Serial No. 773,595

12 Claims. (Cl. 74—732)

This invention relates to variable speed transmissions and has particular reference to the combination of a hydraulic torque converter with mechanical power transmitting means, in order to obtain better operating characteristics than would be obtainable from either the hydraulic or mechanical means alone, the present transmission being an improvement on that disclosed in my Patent 2,308,547, issued January 19, 1943.

The principal object of my invention is to provide a hydraulic transmission in combination with an auxiliary gear drive which will permit the torque obtained from the torque converter to be transmitted to the driven shaft either with direct drive or at a certain gear ratio, and more particularly to provide for smooth and easy shifting to and from forward, neutral and reverse, using only a counter-shaft reverse gear box, and applying a brake on the turbine shaft while shifting.

A further object is to provide such a combined transmission of a simple design, with well known tried and proven parts, to reduce cost and to obtain a trouble-free unit.

Other objects of the invention will appear from the following description in which reference is made to the accompanying drawings, wherein—

Fig. 1 is a more or less diagrammatic longitudinal section through a transmission made in accordance with my invention, this figure including, for convenience of illustration, an operating diagram of the transmission in which appear sections of the two brakes, and both a plan view and vertical section of the shift lever on the steering column and a section of the two control valves of which one is shown as operated by said shift lever;

Fig. 2 is a section on line 2—2 of Fig. 1;

Fig. 3 is a section of the control valves shown in high speed position;

Fig. 4 is a more or less diagrammatic view similar to Fig. 1 showing a variation of the transmission made in accordance with my invention;

Figs. 5 and 6 are sections of the two brakes on the correspondingly numbered lines of Fig. 4, these sections being like those appearing in the lower portion of Fig. 1, and Fig. 7 is another diagrammatic view of a planetary gear set and two-speed countershaft gear box with reverse gearing, which is combinable with a hydraulic turbo drive like that of Fig. 1.

Similar reference numerals are applied to corresponding parts in these views.

Referring first to Figs. 1 to 3, 9 is the driving shaft, which may be the crankshaft of an internal combustion engine or any other prime mover, and 10 is the driven shaft. 11 and 12 are coaxially aligned shafts between shafts 9 and 10. The flywheel 13 turning with the crankshaft 9 carries a ring gear 14 meshing with one of each pair of dual planetary gears 15 provided on a cage 16 mounted on the cover or housing plate 17 integral with the pump impeller 18 of the torque converter. The other of each pair of the dual planetary gears 15 meshes with the sun gear 19 mounted on shaft 11 to which turbine wheel 20 of the torque converter is connected. The reaction member 21 of said converter is mounted on a sleeve 22 which is rigidly attached to the stationary housing 23 that encloses the torque converter and flywheel and may be formed integral with a housing enclosing the rest of the transmission. Ring gear 24 of a second planetary gear set is mounted on the rear end of turbine shaft 11. Intermediate shaft 12 carries a planetary cage 25 and provided thereon are planetary gears 26 meshing with ring gear 24 and also with a sun gear 27. Integral with the sun gear 27 is a sleeve 28 and mounted thereon is a brake drum 29. Brake band 30 cooperates with brake drum 29. Ring gear 24 also serves as a brake drum and has a cooperating brake band 31. Planetary cage 25 carries an extension 32 on which is carried one set of discs of a disc clutch 33, the other set of intermediate discs being carried on the inside of drum 29. Clutch 33 serves to connect or disconnect the planetary cage 25 and the sun gear 27. Drive gear 34 is mounted on intermediate shaft 12 and meshes with gear 35 on countershaft 36. Gear 37 turning with gear 35 meshes with a reverse idler gear indicated in dotted lines at 38, which in turn meshes with gear 39 free to turn on the driven shaft 10. Hub 40 is mounted on driven shaft 10 and shifting collar 41 is free to slide on splines on hub 40. Moving shifting collar 41 to the left will engage clutching teeth 42 of gear 34 for forward drive, and moving collar 41 to the right will engage clutching teeth 43 of gear 39 for reverse drive. The collar 41 is shown in Fig. 1 in the middle or neutral position.

The operation of brake bands 30 and 31 is clearly shown in the lower portion of Fig. 1. Gear shift lever 44 is arranged under and adjacent the steering wheel of the car on the steering column in the usual way and, while in actual practice it serves as a remote control for the shifting collar 41, in this diagrammatic illustration it is shown as arranged to have a substantially direct operating connection with the shifting collar 41. Thus, when lever 44 is raised to the dotted line position shown in the lower portion of Fig. 1, to disengage it from one of the notches in the keeper plate 45, toward which it is urged by spring 46, lateral movement of shift lever 44 from the neutral (N) position to forward (F) or reverse (R) drive position, causes endwise movement of rod 48 and corresponding movement of shifting collar 41, because the latter is connected to rod 48 by means of a fork 49 and the rod 48 is operatively connected to shift lever 44 through a bell-crank lever 50 and connecting rod 51. Now, lever 44 is connected through a link 52 with one of two control valves 53 and 54. Lever 44 operates valve 53, and an electric solenoid 55 operates valve 54. An oil pump 56 suitably driven by the engine of the car delivers oil under pressure from a reservoir through line 57 to the body of valve 54 and thence to the body of valve 53. Therefore, when shift lever 44 is raised, as above stated, valve 53 is also raised and oil is delivered under pressure from the body of valve 53 through line 58 to apply brake band 31 so as to hold turbine shaft 11 stationary. The band 31 has one outwardly bent end of its metal backing abutting an adjustable set screw 59, and has the other end movable with a bell-crank lever 60 which is operable by means of a piston 61 working in a cylinder 62 to which one branch of line 58 is connected. A coiled compression spring 63 normally urges piston 61 to a retracted position releasing the brake, and it is only when control valve 53 is shifted upwardly with lever 44, as stated, that the oil under pressure is delivered to cylinder 62. Hence, it is clear that the brake is applied to turbine shaft 11 only while shifting to and from forward, neutral and reverse. While the brake is applied to turbine shaft 11 by band 31, band 30 is also released because oil under pressure is simultaneously delivered through the other branch of line 58 and body of valve 54 and line 64 to cylinder 65 to force piston 66 back against resistance of brake applying spring 67. The band 30, in other words, is like band 31 but the oil pressure operation thereof is reversed. The band 30, when exerting a braking action, serves to hold the sun gear 27 stationary. When the turbine shaft 11 is held by band 31, and band 30 is released and clutch 33 is also released, the intermediate shaft 12 is free floating and shift collar 41 can be moved easily to forward or reverse position and back to neutral in the gear box. After the shift is made, lever 44 is returned by spring 46 to its former retracted position so that control valve 53 is also returned to its lower position releasing brake band 31 and allowing band 30 to be applied under spring pressure. The clutch 33 is also operable by oil pressure as clearly shown in Fig. 1. Direct drive valve 54 is moved to the position shown in Fig. 3 by energization of solenoid 55 when high range is desired. Solenoid 55 can be energized in any suitable manner, that is, automatically in response to a predetermined speed of the vehicle or by manual control. High range is obtained by delivering oil under pressure to cylinder 68 through line 68' from the body of valve 54, and simultaneously delivering oil under pressure to cylinder 65, clutch 33 being thereby engaged by piston 69 moving forward against resistance of its return spring 70, and brake band 30 being released by the backing up of its spring actuated piston 66.

In operation, therefore, with the shifting collar 41 and shift lever 44 in neutral position there is no drive transmitted to driven shaft 10, although driving shaft 9 and flywheel 13 and ring gear 14 may, for example, be running at idling speed. The lever 44 is held in the middle notch of the keeper plate 45 by the spring 46. There is oil pressure at that time in the line 57, and the pressure is communicated through line 71 to the body of valve 53, but with the valve 53 in the lower position, there can be no flow of oil from the valve. Hence, the shifting brake band 31 is free, high range clutch 33 is free, and the low speed brake band 30 holds the drum 29, because the band 30 is applied by pressure of the spring 67, and is arranged to be released by oil pressure. To shift into gear, lever 44 must be raised out of its notch in the keeper plate, 45 and in so doing, valve 53 is also raised and allows oil to flow from the pump 56 through line 57 to valve 52 and thence through line 71 to valve 53, which, being raised, allows the oil to pass through line 58 back to valve 54, and thence through line 64 to the cylinder 65 so as to move the piston 66 against the resistance of spring 67 to release the band 30. It will also be noticed that the line 58 has another branch through which oil under pressure is delivered to the cylinder 62 to move the piston 61 against the resistance of its spring 63 to apply the band 31 so as to hold the drum 24, and thereby hold the turbine shaft 11 stationary. The gear shift can now be completed by moving lever 44 into the forward or reverse position marked F and R in the upper portion of Fig. 1, because band 31 is holding the drum 24, band 30 is released, and clutch 33 is released, allowing shaft 12 to be free so that the shifting collar 41 can engage teeth 42 or 43, as desired. Assuming lever 44 has been moved to the forward position and released, the spring 46 returns it to its lowered position and it engages in a registering notch in the keeper plate 45. Valve 53 is accordingly moved downwardly shutting off the oil flow in line 58 and bleeding oil pressure from cylinders 62 and 65 so that band 31 is released and band 30 is engaged under the pressure of spring 67. The vehicle now moves forward at low speed. To shift into high speed or direct drive, valve 54 is moved upwardly by energization of the electrical solenoid 55, allowing oil under pressure from line 57 to pass through the valve 54 to lines 64 and 69 that extend to cylinders 65 and 68, respectively. Oil delivered to cylinder 65 under pressure releases the band 30 and oil delivered under pressure to cylinder 68 engages the clutch 33. The vehicle now runs at high speed because the sun gear 27 and carrier 25 are turning at the same speed due to the engagement of clutch 33, and because the bands 30 and 31 are both released. In other words, the entire planetary gear set turns as a unit, and shafts 10, 11 and 12 turn at the same speed. Obviously, low and high gear ranges in reverse are also obtained in a similar way when the shift lever 44 is moved to the other extreme position marked R in Fig. 1. The shifting brake 31 is always applied automatically whenever the lever 44 is raised to the shifting position. The same is true regarding the automatic disengagement of brake 30, so that the sun gear 27 and planetary carrier 25 are free floating. Shifting collar 41 is therefore movable freely in either direction to engage or disengage clutch teeth 42 or 43 without effort, there being no torque or drag present in the free floating shaft 12.

The modified or alternative construction disclosed in Figs. 4 to 6 incorporates the same basic features as the transmission of Figs. 1 to 3, but omits the planetary gear set in front of the torque converter and includes a dual planetary gear set behind it. Parts in Figs. 4 to 6 correspondingly to parts in Figs. 1 to 3 have been correspondingly numbered. Thus, the driving and driven shafts are 9a and 10a, respectively, and the turbine shaft is 11a and the intermediate shaft 12a. The flywheel 13a in this form has the pump impeller 18a directly connected therewith and cooperating with the turbine wheel 20a and reaction member 21a. The latter is carried on a sleeve 22a rigidly attached to the stationary housing 23a. The planetary carrier 80 is mounted on the turbine shaft 11a and carries pairs of intermeshed planetary pinion gears 81, one of each meshing with ring gear 82, and the other with sun gear 83. Ring gear 82 is mounted on intermediate shaft 12a which in turn drives the driven shaft 10a in forward or reverse direction through the gearing in the gear box numbered 34a to 43a to correspond with the numbering of the parts 34 to 43 in Fig. 1. A brake drum 84 is provided on the planetary cage 80, and another brake drum 85 is provided on a tubular extension 86 of the sun gear 83. A disc clutch 87 is provided between the brake drum 85 and the hub extension 88 of the brake drum 84 and planetary carrier 80 to connect or disconnect the planetary carrier 80 and sun gear 83. A brake band 89 cooperates with brake drum 84 and corresponds in its construction and mode of operation to the brake band 31 of Fig. 1, and therefore the means for operating this band has been correspondingly numbered 58a to 63a. The brake band 90 cooperating with brake drum 85 corresponds in construction and mode of operation to the brake band 30 of Fig. 1 and the means for operating the same has been numbered correspondingly 64a to 67a. The oil lines 58a and 64a illustrated in Figs. 7 and 8 correspond to the lines 58 and 64 of Figs. 1 and 3, and it should, of course, be understood that the same manually operable shift lever 44 and solenoid 55 and control valves 53 and 54 disclosed in Figs. 1 and 3, are employed in connection with the transmission of Figs. 4 to 6.

The operation of the transmission of Figs. 4 to 6 is quite similar to that previously described, the planetary converter drive being merely replaced by a plain converter and the rear planetary gear set being merely replaced by a dual planetary gear set. The countershaft reverse gear set is the same in both transmissions. Thus, when the gear shift lever 44 is raised to the dotted line position shown in the lower portion of Fig. 1, the brake band 89 is applied holding the planetary cage 80 and turbine shaft 11a stationary, the intermediate shaft 12a under these circumstances being free floating as in the case of the other transmission so that the shift collar 41a can be moved in either direction freely to and from forward, neutral, or reverse position. When brake band 90 is applied by spring pressure holding the sun gear 83 stationary, the turbine shaft 11a drives the planetary carrier 80 and drive is transmitted from it through the dual planetary gears 81 to the ring gear 82 so that the intermediate shaft 12a is driven at a speed lower than the turbine shaft 11a, for low speed driving of driven shaft 10a, similarly as in the operation of the other transmission. In this low speed drive, the clutch 87 it will be understood is disengaged similarly as in the operation of clutch 33 in Fig. 1 in the other transmission. Hence, when brake band 90 is disengaged by the admission of oil under pressure to cylinder 65a (Fig. 5) and clutch 87 is at the same time engaged like clutch 33 of Fig. 1, the sun gear 83 is connected with the planetary carrier 80 so that the intermediate shaft 12a and the turbine shaft 11a are caused to run together at the same speed, the dual planetary gear set 81 being locked. In the operation of this transmission, as in the operation of the other, the fact that the shift lever 44 must be raised to the dotted line position shown in Fig. 1 insures the application of the brake band 89 to hold the turbine shaft 11a stationary during the shifting operation so as to provide for smooth and easy shifting to and from forward, neutral and reverse.

Referring next to Fig. 7, it will be understood that the planetary gear set and two speed countershaft gear box with reverse gearing shown here is combinable with a hydraulic turbo drive like that of Fig. 1. Hence, shaft 11b of Fig. 7 corresponds to shaft 11 of Fig. 1, intermediate shaft 12b to 12, and driven shaft 10b to 10. The parts numbered 24b—33b correspond to parts 24—33 in Fig. 1 and parts 68b—70b correspond to parts 68—70. However, the gear box shown here is different from that of Fig. 1 and requires two shifting collars 141 and 241, collar 141 corresponding to collar 41 of Fig. 1 and being operable with the gear shift lever 44 in a similar way so as to release band 30b and apply band 31b when the collar 141 is shifted to or from forward, neutral, and reverse, whereby to hold the turbine shaft 11b while the shift occurs. The two collars 141 and 241 are both shown in neutral position. Collar 141, like collar 41, is arranged to shift from neutral to forward or reverse by moving to the right or left, respectively, from the position shown. Collar 241 is moved either to the left hand position for high gear, or to the right hand position for low gear, as desired. The markings "F" and "R" for collar 141 indicate forward and reverse drive positions, respectively. The markings "high" and "low" indicate, respectively, high and low gear positions for collar 241. Inasmuch as the gearing shown in the gear box is otherwise conventional it is believed that a more detailed description is unnecessary. The patentable novelty lies in its use in the general combination.

In operation, low speed drive is obtained by shifting collar 141 to the left to clutch teeth 62b of bushing 100 with its splines 101, and collar 241 is moved to the right engaging teeth 102 integral with gear 103. Shaft 12b then drives through gears 104, 105, 106 and 103. The latter, being connected to collar 141 transmits drive to driven shaft 10b, which then runs at a reduced speed relative to shaft 12b. In high speed, collar 141 remains in the left hand position but collar 241 is moved to the left, engaging teeth 107 of gear 104. Then shaft 12b and gear 104 transmit drive through teeth 107 and collar 241 to bushing 100, and thence through teeth 62b and collar 141 to driven shaft 10b, which accordingly turns at the same speed as shaft 12b. When collar 241 is moved to high or low speed position the clutch 33b and band 30b are released momentarily as described above in regard to Fig. 1 for clutch 33 and band 30, but without braking and holding the turbine shaft 11b, the synchronizers 108 in collar 241 serving to make for easy shifting without clashing of gears. It will be clear that when either gear ratio is selected in the rear box the driven shaft 12b of the planetary gear set can be made to run either at the same speed as the turbine shaft 11b or at a reduced speed, thereby giving a four speed transmission with a two speed box and obtaining moreover easy shifting for all speeds.

It is believed the foregoing description conveys a good understanding of the objects and advantages of my invention. The appended claims have been drawn to cover all legitimate modifications and adaptations.

I claim:

1. A transmission comprising in combination with driving and driven elements, a hydraulic turbo drive comprising at least a pump impeller and a turbine wheel, means providing a driving connection between said pump impeller and said driving element, a planetary gearing and a reverse gearing interconnected for transmitting drive from the turbine wheel to the driven element as a direct drive or as a gear ratio drive, said reverse gearing including a manually shiftable element shiftable to different positions for forward, neutral, and reverse, said planetary gearing including a ring gear with a brake drum thereon driven by said turbine wheel, planetary gears meshing with the ring gear and mounted on a carrier transmitting drive to the driven element, and a sun gear meshing with the planetary gears and carrying a brake drum and a clutch means, said carrier carrying a second clutch means operatively associated with said first clutch means, brake bands operatively associated with said brake drums, means to engage and disengage said clutch means, and means to engage and disengage said brake bands.

2. A transmission comprising in combination with driving and driven elements, a hydraulic turbo drive comprising at least a pump impeller and a turbine wheel, means providing a driving connection between said pump impeller and said driving element, a planetary gearing and a reverse gearing interconnected for transmitting drive from the turbine wheel to the driven element as a direct drive or as a gear ratio drive, said reverse gearing including a manually shiftable element shiftable to different positions for forward, neutral, and reverse, said planetary gearing including a ring gear with a brake drum thereon driven by said turbine wheel, planetary gears meshing with the ring gear and mounted on a carrier transmitting drive to the driven element, and a sun gear meshing with the planetary gears and carrying a brake drum, brake bands operatively associated with said brake drums, means to engage and disengage said brake bands, and means for releasably locking said planetary gearing to turn as a unit.

3. A transmission as set forth in claim 2, wherein the means for transmitting drive from the drive element to the pump impeller comprises a planetary gear unit, of which one element is connected with the driving element, another element is connected with the pump impeller, and another element is connected with the turbine wheel.

4. A transmission comprising in combination with driving and driven elements, a turbine ring type torque converter comprising a pump impeller, a turbine wheel, and a reaction element, means providing a driving connection between said pump impeller and said driving element, a planetary gearing and a reverse gearing interconnected for transmitting drive from the turbine wheel to the driven element as a direct drive or as a gear ratio drive, said reverse gearing including a manually shiftable element shiftable to different positions for forward, neutral, and reverse, said planetary gearing including a ring gear with a brake drum thereon driven by said turbine wheel, planetary gears meshing with the ring gear and mounted on a carrier transmitting drive to the driven element, and a sun gear meshing with the planetary gears and carrying a brake drum and a clutch means, said carrier carrying a second clutch means operatively associated with said first clutch means, brake bands operatively associated with said brake drums, means for applying the brake band to the first-mentioned brake drum in the shifting of the manually shiftable element to and from forward, neutral and reverse, means to engage and disengage said clutch means, and means to engage and disengage the brake band on the second brake drum.

5. A transmission comprising in combination with driving and driven elements, a turbine ring type torque converter comprising a pump impeller, a turbine wheel, and a reaction element, means providing a driving connection between said pump impeller and said driving element, a planetary gearing and a reverse gearing interconnected for transmitting drive from the turbine wheel to the driven element as a direct drive or as a gear ratio drive, said reverse gearing including a manually shiftable element shiftable to different positions for forward, neutral, and reverse, said planetary gearing including a ring gear with a brake drum thereon driven by said turbine wheel, planetary gears meshing with the ring gear and mounted on a carrier transmitting drive to the driven element, and a sun gear meshing with the planetary gears and carrying a brake drum, brake bands operatively associated with said brake drums, means for applying the brake band to the first-mentioned brake drum in the shifting of the manually shiftable element to and from forward, neutral, and reverse, means for releasably locking said planetary gearing to turn as a unit, and means to engage and disengage the other brake band.

6. A transmission as set forth in claim 5, wherein the means for transmitting drive from the drive element to the pump impeller comprises a planetary gear unit, of which one element is connected with the driving element, another element is connected with the pump impeller, and another element is connected with the turbine wheel.

7. A transmission comprising in combination with driving and driven elements, a hydraulic turbo drive comprising at least a pump impeller and a turbine wheel, means providing a driving connection between said pump impeller and said driving element, a planetary gearing and a reverse gearing interconnected for transmitting drive from the turbine wheel to the driven element as a direct drive or as a gear ratio drive, said reverse gearing including a manually shiftable element shiftable to different positions for forward, neutral, and reverse, said planetary gearing including a ring gear with a brake drum thereon driven by said turbine wheel, planetary gears meshing with the ring gear and mounted on a carrier transmitting drive to the driven element, and a sun gear meshing with the planetary gears and carrying a brake drum, brake bands operatively associated with said brake drums, spring means normally holding one of said brake bands engaged, fluid pressure operated means for disengaging said band, spring means normally holding the other brake band disengaged, fluid pressure operated means for engaging said band, fluid pressure operated means for releasably locking said planetary gearing to turn as a unit, a source of pressure fluid supply, and valve means for controlling the delivery of fluid from said source to said fluid pressure operated means and drainage of fluid therefrom.

8. A transmission comprising in combination with driving and driven shafts in coaxially spaced relation, a turbine shaft and an intermediate shaft coaxially arranged therebetween, a hydraulic turbo drive comprising at least a pump impeller driven by the driving shaft and a turbine wheel mounted on the turbine shaft, a planetary gear set comprising a ring gear connected to and turning with the turbine shaft, a sun gear, and planetary gears meshing with the ring gear and sun gear and carried on a carrier connected to and turning with the intermediate shaft, a brake drum turning with the ring gear and having a brake band surrounding the same to hold or release the turbine shaft, the planetary carrier carrying a clutch means, said sun gear carrying a brake drum and a second clutch means in cooperating relation with the first clutch means, a brake band surrounding the second drum to hold the sun gear stationary when not clutched to the intermediate shaft, means to engage and disengage the second brake band, means to engage and disengage said clutch means, reverse gearing interposed between the intermediate shaft and driven shaft, including shifting mechanism to select forward, reverse, or neutral, a shift lever connected to operate said shifting mechanism, and means connected to operate with the shift lever the first-mentioned brake band.

9. A transmission comprising in combination with driving and driven shafts in coaxially spaced relation, a turbine shaft and an intermediate shaft coaxially arranged therebetween, a hydraulic turbo drive comprising at least a pump impeller driven by the driving shaft and a turbine wheel mounted on the turbine shaft, a planetary gear set comprising a ring gear connected to and turning with the turbine shaft, a sun gear, and planetary gears meshing with the ring gear and sun gear and carried on a carrier connected to and turning with the intermediate shaft, a brake drum turning with the ring gear and having a brake band surrounding the same to hold or release the turbine shaft, said sun gear carrying a brake drum, a brake band surrounding the latter drum to hold the sun gear, means to engage and disengage the second brake band, means for releasably locking the planetary gearing to turn as a unit, reverse gearing interposed between the intermediate shaft and driven shaft, including shifting mechanism to select forward, reverse, or neutral, a shift lever connected to operate said shifting mechanism, and means connected to operate with the shift lever the first-mentioned brake band.

10. A transmission comprising in combination with driving and driven elements, a hydraulic turbo-drive comprising at least a pump impeller and a turbine wheel, an intermediate shaft arranged between the driving and driven elements driven by the turbine wheel, a gearbox comprising gears for forward and reverse drives adapted to be interconnected by positive engaging means for transmitting forward or reverse drive selectively from the intermediate shaft to the driven element, said gearbox including a shiftable element shiftable to different positions for selection of forward, neutral and reverse, friction clutch means behind the turbo-drive, brake means connected so as to be operable in the shifting of said shiftable element to brake the turbine wheel during shifting, and means connected so as to be operable in shifting of said shiftable element to disengage said clutch means, whereby to provide in the intermediate shaft a floating member in the transmission train between the turbine wheel and the final driven element.

11. A transmission as set forth in claim 10, including a planetary gearing, comprising at least three elements, wherein said friction clutch means is arranged on and between the elements of said planetary gearing.

12. A transmission comprising in combination with driving and driven elements, a hydraulic drive comprising at least a pump impeller and a turbine wheel, an intermediate shaft arranged between the driving and driven elements driven by the turbine wheel, a planetary gearing comprising at least three elements, one gear element of which turns with said intermediate shaft, and friction clutch means on and between said elements adapted to lock the planetary gearing so as to turn as a unit, and a gearbox comprising forward and reverse gears adapted to be interconnected for transmitting drive selectively from the intermediate shaft to the driven element, said gearbox including a manually shiftable element shiftable to different positions for selection of forward, neutral and reverse, brake means connected so as to be operable in shifting of said shiftable element to brake the turbine wheel during shifting, and means connected so as to be operable in shifting of said shiftable element to disengage said friction clutch means of the planetary gearing during shifting, whereby to provide in the intermediate shaft a floating member in the transmission train between the turbine wheel and the final driven element.

ADOLF G. SCHNEIDER.

References Cited in the file of this patent

UNITED STATES PATENTS

| Number | Name | Date |
|---|---|---|
| 2,224,884 | Schneider et al. | Dec. 17, 1940 |
| 2,281,118 | Smirl | Apr. 28, 1942 |
| 2,298,648 | Russell | Oct. 13, 1942 |
| 2,308,547 | Schneider | Jan. 19, 1943 |
| 2,316,390 | Biermann | Apr. 13, 1943 |
| 2,324,733 | Smirl | July 20, 1943 |
| 2,328,392 | Neracher | Aug. 31, 1943 |
| 2,332,593 | Nutt et al. | Oct. 26, 1943 |
| 2,333,681 | Schneider | Nov. 9, 1943 |
| 2,343,955 | Cotterman | Mar. 14, 1944 |
| 2,408,008 | Tipton | Sept. 24, 1946 |
| 2,414,359 | Carnagua | Jan. 14, 1947 |
| 2,541,391 | Weiss et al. | Feb. 15, 1951 |